United States Patent
Sayers et al.

(10) Patent No.: US 10,069,755 B1
(45) Date of Patent: Sep. 4, 2018

(54) SYSTEMS AND METHODS FOR PRIORITY-BASED ALLOCATION OF NETWORK BANDWIDTH

(71) Applicant: MasterCard International Incorporated, Purchase, NY (US)

(72) Inventors: Jayson C. Sayers, Saint Paul, MO (US); Donald Allen Pape, St. Charles, MO (US); Donald S. Thompson, Kirkwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 91 days.

(21) Appl. No.: 15/200,518

(22) Filed: Jul. 1, 2016

(51) Int. Cl.
*G06F 15/173* (2006.01)
*H04L 12/927* (2013.01)
*H04L 12/853* (2013.01)
*H04L 29/08* (2006.01)

(52) U.S. Cl.
CPC ........ *H04L 47/805* (2013.01); *H04L 47/2416* (2013.01); *H04L 67/322* (2013.01)

(58) Field of Classification Search
None
See application file for complete search history.

(56) References Cited

U.S. PATENT DOCUMENTS

| | | | |
|---|---|---|---|
| 6,067,301 A | 5/2000 | Aatresh | |
| 6,947,388 B1 | 9/2005 | Wagner | |
| 6,973,315 B1 | 12/2005 | Miernik et al. | |
| 7,039,715 B2 | 5/2006 | England et al. | |
| 7,349,704 B2 | 3/2008 | Miernik et al. | |
| 7,369,495 B1 | 5/2008 | Lemaire et al. | |
| 7,577,161 B2 | 8/2009 | Li et al. | |
| 7,606,154 B1 * | 10/2009 | Lee .............. | H04J 3/14 370/232 |
| 7,886,074 B2 | 2/2011 | England et al. | |
| 8,027,361 B2 | 9/2011 | Li et al. | |
| 8,045,458 B2 | 10/2011 | Alperovitch et al. | |
| 8,521,883 B1 | 8/2013 | Wartnick et al. | |
| 9,084,276 B2 | 7/2015 | Grabowsky et al. | |
| 2002/0133589 A1 | 9/2002 | Gubbi et al. | |
| 2004/0143663 A1 * | 7/2004 | Leedom .............. | H04L 47/15 709/226 |
| 2005/0071471 A1 | 3/2005 | Saenz | |
| 2005/0174958 A1 | 8/2005 | Miller et al. | |
| 2006/0020703 A1 | 1/2006 | England et al. | |
| 2008/0165685 A1 * | 7/2008 | Weiss .............. | H04L 47/801 370/231 |
| 2010/0157920 A1 | 6/2010 | Choi et al. | |
| 2010/0296520 A1 | 11/2010 | Matthews et al. | |
| 2012/0011252 A1 | 1/2012 | Alperovitch et al. | |

\* cited by examiner

*Primary Examiner* — Mohamed Ibrahim
(74) *Attorney, Agent, or Firm* — Armstrong Teasdale LLP

(57) ABSTRACT

A transmission control device for allocating a determined amount of bandwidth for processing a priority class of data messages is provided. A processor is configured to retrieve message volume data. The processor is further configured to determine a projected peak amount of messages received per second based on the message volume data. The processor is also configured to determine a peak bandwidth demand for the priority class of data messages based upon the projected peak amount of messages received per second. The processor is further configured to configure the router to allocate the determined amount of bandwidth to the priority class of data messages.

21 Claims, 5 Drawing Sheets

US 10,069,755 B1

SYSTEMS AND METHODS FOR PRIORITY-BASED ALLOCATION OF NETWORK BANDWIDTH

BACKGROUND OF THE DISCLOSURE

This invention relates generally to the field of computer networks, and more specifically, to network-based systems and methods for determining and allocating an amount of network bandwidth sufficient to process at least a priority class of data messages during periods of peak bandwidth demand.

At least some known data networks experience issues with scheduling and routing data transmissions. Some of these known systems also fail to allocate bandwidth efficiently. For example, some known networks do not differentiate between different types of data being transmitted. In some cases, data requiring delivery within a certain time frame is not given preference over data that generally does not require a particular delivery time. Similarly, transmissions carrying important information for which data loss cannot be tolerated (e.g., real-time financial messages) receive no greater priority than less-important transmissions. Because all data is viewed as equally important in terms of allocating transmission resources, less critical transmissions may serve to delay or displace more important, time-sensitive transmissions.

In some of these known systems, transmission capacity (i.e., bandwidth) is inefficiently allocated. In some instances, bandwidth may be allocated to a particular user according to a fixed schedule or particular network setup, but the bandwidth may not be used. These known data networks lack mechanisms to allocate a percentage of the bandwidth to a priority class of data messages to ensure that important transmissions are given priority over less important transmissions.

BRIEF DESCRIPTION OF THE DISCLOSURE

In one aspect, a transmission control device for allocating a determined amount of bandwidth for processing a priority class of data messages is provided. The device includes a processor coupled to a memory and a router. The processor is configured to retrieve, from the memory, message volume data. The processor is further configured to determine a projected peak amount of messages received per second based on the message volume data. The processor is also configured to determine a peak bandwidth demand for the priority class of data messages based upon the projected peak amount of messages received per second. The processor is further configured to configure the router to allocate the determined amount of bandwidth to the priority class of data messages. The determined amount of bandwidth is at least equal to the peak bandwidth demand for the priority class of data messages.

In another aspect, a system for allocating a determined amount of bandwidth for processing a priority class of data messages is provided. The system includes a processor coupled to a memory and a router. The processor is configured to retrieve, from the memory, message volume data. The processor is further configured to determine a projected peak amount of messages received per second based on the message volume data. The processor is also configured to determine a peak bandwidth demand for the priority class of data messages based upon the projected peak amount of messages received per second. The processor is further configured to configure the router to allocate the determined amount of bandwidth to the priority class of data messages. The determined amount of bandwidth is at least equal to the peak bandwidth demand for the priority class of data messages.

In yet another aspect, a method for allocating a determined amount of bandwidth for processing a priority class of data messages is provided. The method is implemented using a processor coupled to a memory and a router. The method includes retrieving, from the memory, message volume data. The method further includes determining a projected peak amount of messages received per second based on the message volume data. The method also includes determining a peak bandwidth demand for the priority class of data messages based upon the projected peak amount of messages received per second. The method further includes configuring the router to allocate the determined amount of bandwidth to the priority class of data messages, wherein the determined amount of bandwidth is at least equal to the peak bandwidth demand for the priority class of data messages.

BRIEF DESCRIPTION OF THE DRAWINGS

FIG. 1 illustrates a configuration of a transmission control (TC) computing device shown in FIGS. 3 and 4, in accordance with an example embodiment of the present disclosure.

FIG. 2 illustrates a configuration of a network computing device shown in FIGS. 3 and 4, in accordance with an example embodiment of the present disclosure.

FIG. 3 is a block diagram illustrating a communication network, including the TC computing device shown in FIG. 1 and the network computing device shown in FIG. 2, in accordance with an example embodiment of the present disclosure.

FIG. 4 is a block diagram illustrating a second communication network, including the TC computing device shown in FIG. 1, a gateway, and a server, in accordance with an example embodiment of the present disclosure.

FIG. 5 is a flowchart of an example method to determine a peak bandwidth demand for a priority class of data messages in a communication network using the TC computing device shown in FIGS. 1, 3, and 4, and to allocate an amount of bandwidth sufficient to process the priority class of data messages during peak bandwidth demand, in accordance with an example embodiment of the present disclosure.

DETAILED DESCRIPTION OF THE DISCLOSURE

Figure 1:
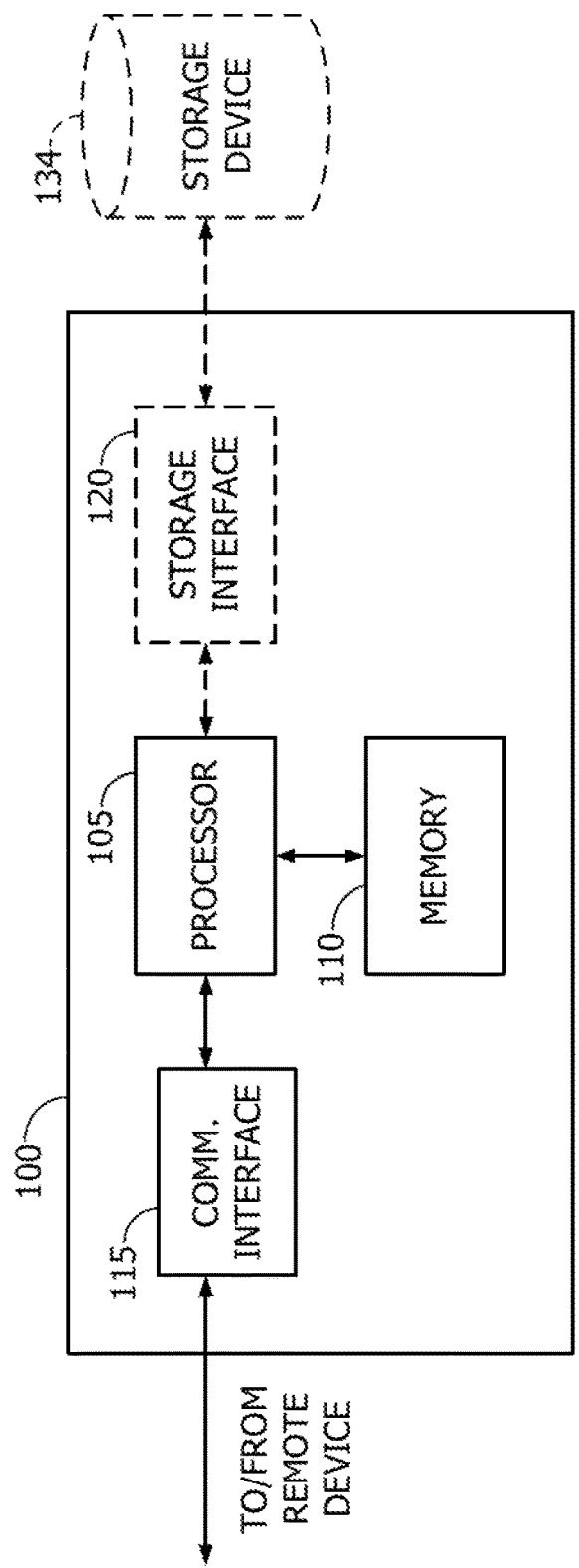
FIGS. 1-5 show example embodiments of the methods and systems described herein.

The systems and methods described herein include a transmission control system (TCS) configured to determine a peak bandwidth demand for a priority class of data messages and to allocate an amount of network bandwidth sufficient to process a priority class of data messages during peak bandwidth demand. The TCS includes a transmission control (TC) computing device in communication with a router. The TC computing device includes a processor and a memory. The router is in communication with a data network, such as a public Internet Protocol (IP) network, a secured network, or other network, to which the router is linked via a network connection. The TC computing device includes a bandwidth calculation component configured to calculate a sufficient amount of bandwidth for processing a priority class of data messages during peak bandwidth demand. The TC computing device further includes a bandwidth control component to configure the router to provide at least a sufficient amount of bandwidth to the priority class during peak bandwidth demand. The router, which includes a router mechanism to classify data packets and allocate bandwidth, connects networks and receives and forwards (i.e., routes) packets between the networks.

The TCS includes congestion management functionality, such as allocating a percentage of the bandwidth to a priority class of data messages that can be used in a data network that is designed to support different transmission types that share a single data path between processing locations. The congestion management functionality can be used for network capacity planning to ensure that data packets within the priority class can be delivered during peak bandwidth demand. The TCS, and in particular the router mechanism, controls data package congestion by assigning a priority classification to each data packet. The data packets are assigned to one or more priority classes, wherein, for example, a first priority class may have a greater priority than a second priority class.

The router assigns each data packet to a queue based on the priority classification of the data packet; for example, all data packets assigned to the first priority class are assigned to a same queue. One or more queues are created by the router based on the one or more priority classes. The router determines an order that the data packets are transmitted from an output interface by controlling which data packets are placed in which queues and how the queues are serviced with respect to each other based on priority. The router schedules the queued data packets for transmission according to the assigned priority.

This prioritization scheme enables networks with multiple transmission-types to optimize response times for time sensitive data (e.g., real-time financial messages) by allocating resources to priority transmissions. During periods of light traffic (i.e., when no congestion exists), data packets are transmitted by the router from the output interface as soon as the data packets arrive. However, during periods of transmission congestion at the output interface, data packets arrive faster than the output interface can send them. The router assigns a priority classification to each data packet and then assigns each data packet to a queue until the data packet can be transmitted. Bandwidth that has been allocated to a priority class, but is not being used by the priority class, can be utilized for lower priority transmissions.

The TC computing device, and in particular the bandwidth calculation component, is configured to determine a peak bandwidth demand for a priority class of data messages, where a predefined percentage of the peak bandwidth is allocated to the priority class. Data packets within the priority class have access to that percentage of the peak bandwidth during periods of peak bandwidth demand. The TC computing device, and in particular the bandwidth control component, configures the router to allocate to the priority class a bandwidth amount equal to or great than the peak bandwidth demand for the priority class. This ensures that network resources will be available for high priority transmissions.

As explained in detail below, the bandwidth calculation component is configured to determine a peak bandwidth demand for a priority class by multiplying annual, monthly, daily, hourly, and per second message volumes by predefined conversion factors. The conversion factors, which are stored in the memory, are predetermined values based upon statistical analysis of historical message arrival rates across different locations. Since messages (e.g., data messages, financial transactions, messages, etc.) are not evenly distributed throughout the day, the conversion factors are based upon a distribution of message traffic to determine a statistical peak that can be expected for a predetermined period of time. For example, analyzing daily traffic patterns provide a conversion factor that can be used to estimate a peak daily message volume.

In the example embodiment, the bandwidth calculation component uses the following conversions factors to determine a peak bandwidth demand for a priority class. In the example embodiment, the bandwidth calculation component begins with a projected annual message volume, which is stored in the memory. The projected annual message volume is based upon one or more of projected marketing or sales transactions, figures provided by a customer (e.g., a bank, a financial institution, or other entities sending priority messages), historical data, or projected growth rates.

The bandwidth calculation component uses a peak monthly volume conversion factor (PMVF) to convert the projected annual message volume into a projected peak monthly message volume. The projected peak monthly message volume is converted into a projected peak daily message volume using a peak daily volume conversion factor (PDVF). The projected peak daily message volume is converted to a projected peak hourly message volume using a peak hourly volume factor (PHVF). Finally, the projected peak hourly message volume is converted to a projected peak volume of messages per second (known as "peak messages per second" or PMPS) using a peak messages per second volume conversion factor (PSVF). The bandwidth calculation component can also determine a peak bandwidth demand for a priority class by beginning with the peak monthly message volume, the peak daily message volume, the peak hourly message volume, or the peak volume of messages per second, and then following the remainder of the above described procedure.

The bandwidth calculation component determines the peak bandwidth demand (in bytes per second) for the priority class of data messages by multiplying the PMPS with a predefined average message payload (i.e., the average bytes per message), which is stored in memory. The peak bandwidth demand for the priority class is the sufficient amount of bandwidth allocated by the router to the priority class during periods of peak bandwidth demand. The sufficient amount of bandwidth is a determined amount of bandwidth that is capable of handling the calculated priority class of data messages during periods of peak bandwidth demand. The bandwidth control component configures the router to allocate an amount of bandwidth to the priority class that is equal to the peak bandwidth demand for the priority class.

The bandwidth calculation component further determines a total amount of peak bandwidth needed to ensure that there is sufficient bandwidth available to meet the peak bandwidth demand for the priority class, where the priority class is allocated a predefined percentage of the bandwidth during peak demand. The amount of sufficient peak bandwidth is determined by dividing the peak bandwidth demand for the priority class by the predefined percentage of the peak bandwidth allocated to the priority class. The peak bandwidth is sufficiently large such that the priority class can be allocated a percentage of the peak bandwidth that equals the peak bandwidth demand for the priority class. For example, if a peak bandwidth demand for a priority class is determined to be 100,000 bits per second and the priority class is allocated 50% of the peak bandwidth, the peak bandwidth is 200,000 bits per second. This ensures that the network has a circuit bandwidth size that is large enough to support the peak bandwidth demand for the priority class.

In summary, the bandwidth calculation component uses the following steps to determine a peak bandwidth demand (in bits per second) for a priority class based on a projected annual message volume and to determine a total amount of peak bandwidth needed to support the peak bandwidth demand for the priority class, where the priority class of data messages is allocated a predefined percentage of the peak bandwidth:

Determine peak messages per month (PMPM)= (Yearly Message Volume)×(PMVF); (1)

Determine peak messages per day (PMPD)= (PTPM)×(PDVF); (2)

Determine peak messages per hour (PMPH)= (PTPD)×(PHVF); (3)

Determine peak messages per second (PMPS)= (PTPH)×(PTVF); (4)

Determine peak bandwidth demand (Bytes per second) for the priority class=(PMPS)×(average message payload); (5)

Determine peak bandwidth demand (bits per second) for the priority class=(peak bandwidth demand in bytes per second)×(8 bits per Byte); (6)

and

Determine the total amount of peak bandwidth (in bits per second) needed to support the peak bandwidth demand for the priority class=(Peak bandwidth demand for the priority class in bits per second)/(percentage of peak bandwidth demand assigned to the priority class). (7)

An example implementation of the TCS includes data packets assigned to a priority class in a queue, where the priority class is assigned 55% of peak bandwidth, a projected annual message volume of 80,000,000, and predefined conversion factors of 0.15 PMVF, 0.04 PDVF, 0.12 PHVF, and 0.0002686 PMPS. The TC computing device retrieves the projected annual message volume, the conversions factors, and the percentage of the peak bandwidth dedicated to the priority class from memory and determines a peak bandwidth demand for the priority class and an amount of peak bandwidth needed to support the peak bandwidth demand for the priority class, as follows:

(1) Determine peak messages per month: 80,000,000× 0.15 PMVF=12,000,000. Thus, there are 12,000,000 messages per month at the peak.
(2) Determine peak messages per day: 12,000,000×0.04 PDVF=480,000. Thus, there are 480,000 messages per day at the peak.
(3) Determine peak messages per hour: 480,000×0.12 PHVF=57,600. Thus, there are 57,600 messages per hour at the peak.
(4) Determine peak messages per second: 57,600× 0.0002686 PMPS=15.47. Thus, there are approximately 16 messages per second at the peak.
(5) Determine the peak bandwidth demand for the priority class (in bytes per second): 15.47×1,000 average message payload=15,471. Thus, the peak bandwidth demand for the priority class is 15,471 bytes per second.
(6) Determine the peak bandwidth demand for the priority class (in bits per second): 15,471×8 bits per byte=123,768. Thus, the peak bandwidth demand for the priority class is 123,768 bits per second. This is the data transfer needed to support the PMPS (i.e., the peak bandwidth demand for messages per second) for the priority class.
(7) Determine the amount of peak bandwidth (in bits per second) needed to support the peak bandwidth demand for the priority class, where there is a 55% priority class allocation: 123,768/0.55=225,032. Thus, the peak bandwidth needed is 225,032 bits per second.

Given the above factors, the priority class of data messages is allocated a sufficient bandwidth of 123,768 bits per second during traffic congestion at the outgoing interface. The TC computing device, in communication with a router, will configure the router to allocate 123,768 bits per second to the priority class during peak bandwidth demand. Accordingly, the router will provide at least a sufficient amount of bandwidth of 123,768 bits per second to the priority class. Of course, this is merely an example of how the system described herein may calculate the sufficient amount of bandwidth for processing this amount of priority data messages. Other values would also be used without departing from the scope of this disclosure.

In some embodiments, the calculations described above are performed by the TC computing device and the calculated results are outputted. The output is then used to program the router, wherein that programming of the router is performed outside of the TC computing device.

The methods and systems described herein may be implemented using computer programming or engineering techniques including computer software, firmware, hardware or any combination or subset thereof, wherein the technical effect is achieved by performing at least one of: (a) determining a peak bandwidth demand for a priority class; (b) determining a total amount of peak bandwidth needed to support the peak bandwidth demand for the priority class; (b) determining a percentage of the peak bandwidth to allocate to the priority class; and (d) configuring the router to allocate a sufficient amount of bandwidth to the priority class during peak bandwidth demand. The technical effects described herein apply to the technical field of determining peak bandwidth demand and allocating a percentage of the peak bandwidth to a priority class. The systems and methods described herein provide the technical advantage of allocating a percentage of the bandwidth to ensure that important data transmissions are given priority over less important data transmissions.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to networks in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 3:
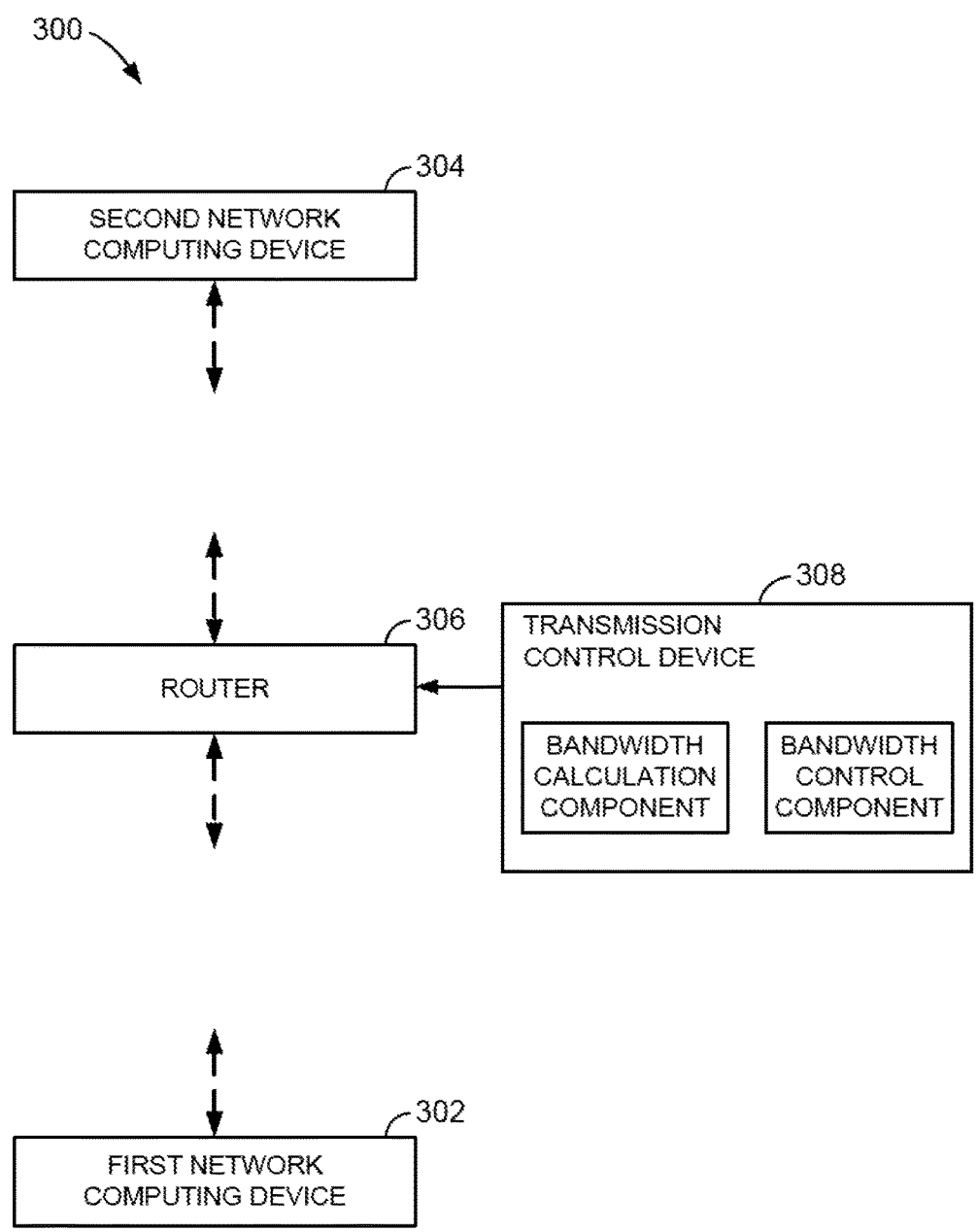
Figure 4:
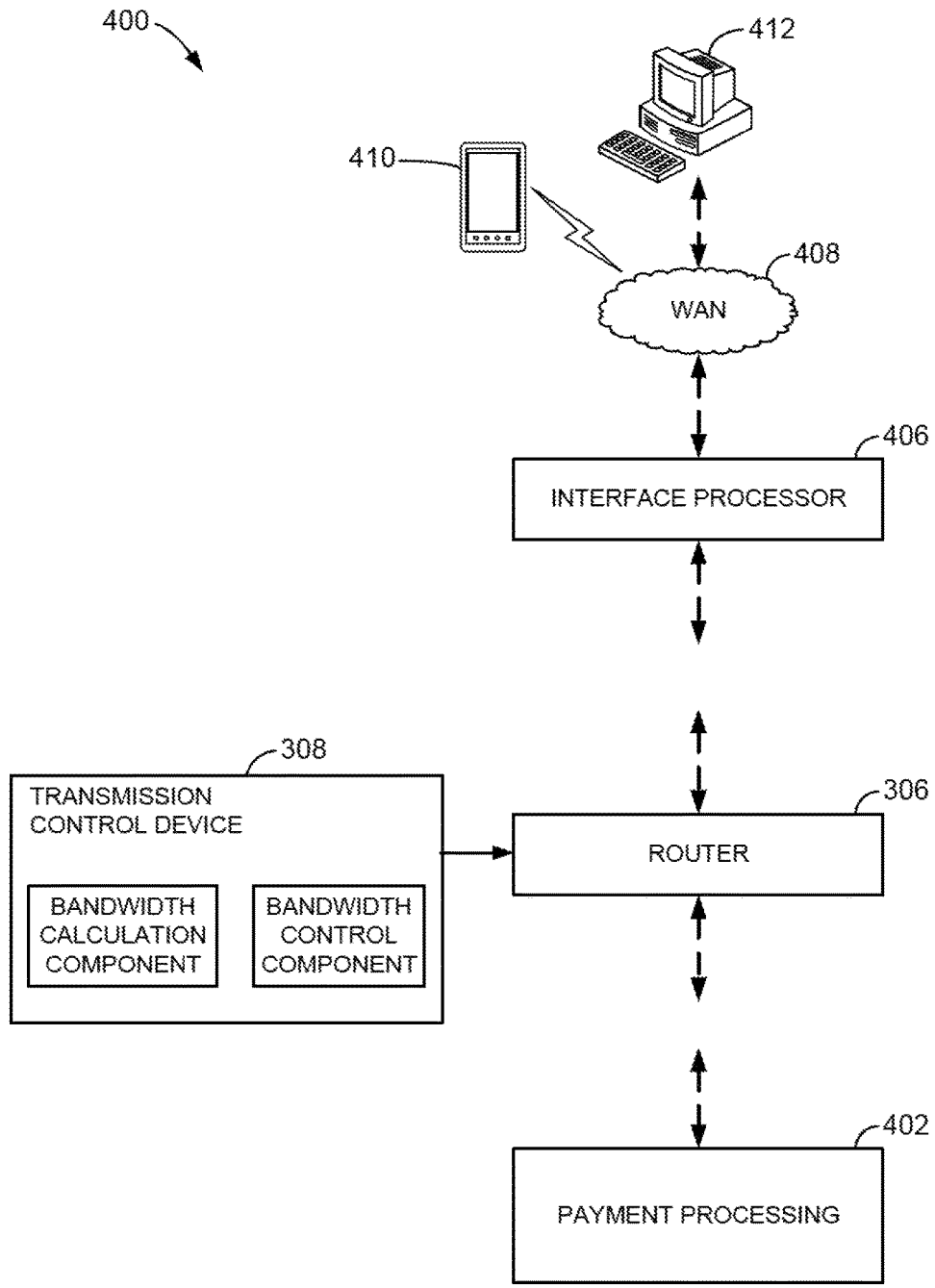

FIG. 1 illustrates an example embodiment of a computing device 100 such as TC (transmission control) computing device as shown in FIGS. 3 and 4 and described above. In the example embodiment, computing device 100 determines a peak bandwidth demand for a priority class and configures a router to allocate the corresponding amount of bandwidth to the priority class.

Computing device 100 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on the computing device 100, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 105 is operatively coupled to a communication interface 115 such that computing device 100 is capable of communicating with a remote device such as a router. Communication interface 115 may also communicate with a user system [not shown in FIG. 1] via the Internet.

Processor 105 may also be operatively coupled to a storage device 134. Storage device 134 is any computer-operated hardware suitable for storing and/or retrieving data. In some embodiments, storage device 134 is integrated in computing device 100. For example, computing device 100 may include one or more hard disk drives as storage device 134. In other embodiments, storage device 134 is external to computing device 100 and may be accessed by a plurality of computing devices 100. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In some embodiments, computing device 100 is configured to be operated by individuals (not shown in FIG. 1), including employees, third parties, and developers using an ISP Internet connection, to transmit data (i.e., conversion factors, message volumes, etc.) to computing device 100, and to receive data from computing device 100, such as a peak bandwidth size needed to support a peak bandwidth demand of a priority class. In some embodiments, computing device 100 includes an input device (not shown in FIG. 1) for receiving input from an individual and at least one media output component (not shown in FIG. 1) for presenting information to the individual. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN, local area network could be used in place of WAN.

Figure 2:
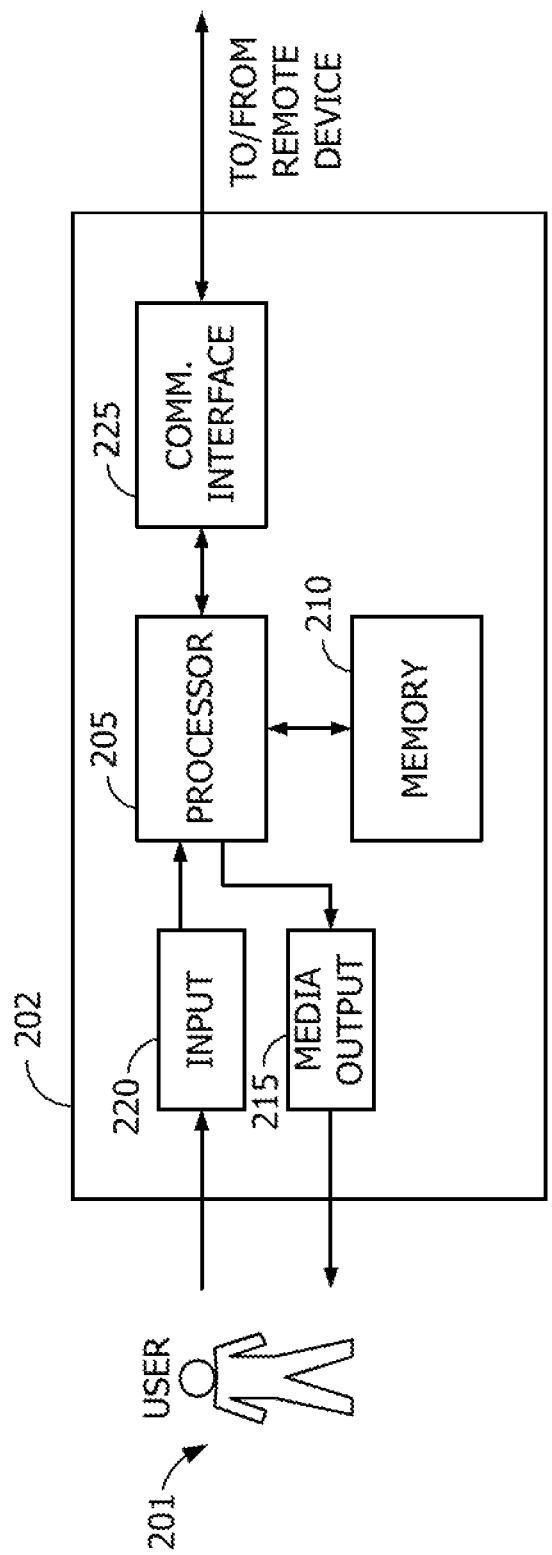

FIG. 2 illustrates an example configuration of a network computing device 200 as shown in FIGS. 3 and 4. Network computing device 200 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

Network computing device 200 also includes at least one media output component 215 for presenting information to a user 201. Media output component 215 is any component capable of conveying information to user 201. In some embodiments, media output component 215 includes an output adapter such as a video adapter and/or an audio adapter. An output adapter is operatively coupled to processor 205 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, network computing device 200 includes an input device 220 for receiving input from user 201. Input device 220 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 215 and input device 220.

Network computing device 200 may also include a communication interface 225, which is communicatively coupleable to a remote device such as a second network computing device 200 or a server. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Network computing device 200 is interconnected to the Internet through many interfaces including a network, such as a local area network (LAN) and/or a wide area network (WAN), dial-in connections, cable modems, wireless-connections, and special high-speed ISDN lines. Network computing device 200 may be any device capable of interconnecting to the Internet including a web-based phone, personal digital assistant (PDA), or other web-connectable equipment. In one embodiment, network computing device 200 includes a point-of-sale (POS) device, a cardholder computing device (e.g., a smartphone, a tablet, or other computing device), or any other computing device capable of communicating with payment processing server computing device (not shown in FIG. 2).

Stored in memory area 210 are, for example, computer-readable instructions for providing a user interface to user 201 via media output component 215 and, optionally, receiving and processing input from input device 220. A user interface may include, among other possibilities, a web browser and client application. Web browsers enable users 201 to display and interact with media and other information typically embedded on a web page or a website hosted by a web server. A client application allows users 201 to interact with an application server.

FIG. 3 is an example block diagram illustrating a communication network 300. The communication network 300 includes first network device 302, second network device 304, router 306, and TC computing device 308. Router 306 is coupled between first network device 302 and second network device 304. Although FIG. 3 displays one router, in alternative embodiments, communication network 300 includes additional routers (N-router) between first network device 302 and second network device 304. First network device 302 is capable of transmitting data to, and receiving data from, second network device 304 via the network path of communication network 300 that includes router 306. In some embodiments, first network device 302 can be a gateway (or router) of a LAN that is part of communication network 300. Communication network 300 may be a WAN, which may be part of the Internet. Second network device 304 can be a server of a service provider; for example, second network device 304 may be a server of an Internet Service Provider (ISP) or a server of a data processing system, such as a payment processing system for processing payment card transactions.

In the exemplary embodiment, first network device 302, coupled to router 306, is capable of transmitting data to, and receiving data from, second network device 304. TC computing device 308, also coupled to router 306, implements a peak bandwidth determination to determine a peak bandwidth demand for a priority class of data messages in the network path between first network device 302 and second network device 304, and configures router 306 to provide to the priority class of data messages during peak bandwidth demand at least an amount of bandwidth equal to the peak bandwidth demand for the priority class. In the exemplary embodiment, TC computing device 308 includes a bandwidth calculation component 310 configured to calculate the peak bandwidth demand for the priority class of data messages in communication network 300. More specifically, bandwidth calculation component 310 determines the peak bandwidth demand for the priority class associated with the network path between first network device 302 and second network device 304, as described above. After determining the peak bandwidth demand of the priority class, bandwidth control component 310 configures router(s) 306 to provide at least a sufficient amount of bandwidth to the priority class of data messages during peak bandwidth demand in the network path, where the sufficient amount of bandwidth is based on a percentage of the overall peak bandwidth allocated to the priority class.

FIG. 4 is an example block diagram illustrating a communication network 400 in which at least a sufficient amount of bandwidth is dedicated to a priority class in the network during peak bandwidth demand, according to some embodiments. As shown in FIG. 4, WAN 408 enables network devices 410 and 412 to access an interface processor 406 that connects to payment processing system 402. In one example, network device 410 may be a smartphone and network device 412 may be a desktop computer, such as network computing device 200 (shown in FIG. 2). In another embodiment, the network devices are point of sale terminals (i.e., a payment terminals). It is noted, however, that the network devices may include various type of wired and wireless networking devices, such as notebook computers, tablet computers, digital cameras, televisions, gaming consoles, smart appliances, and other suitable network devices. Router 306 (shown in FIG. 3) is located in the network path between interface processor 406 and payment processing system 402. Router 306 includes dedicated routers, or may be other suitable network devices that are capable of implementing a routing function. For example, router 306 can be a computer or server that implements a routing function along the network path. Similarly as described above in FIG. 3, TC computing device 308 is coupled to router 306. In alternative embodiments, router 306 includes or is integrated with TC computing device 308.

In the exemplary embodiment, IC computing device 308 includes bandwidth calculation component 310 and bandwidth control component 312. Bandwidth calculation component 310 is configured to determine a peak bandwidth demand for a priority class associated with the network path between gateway 402 and server 406. After identifying the peak bandwidth demand for the priority class, as described above, bandwidth control component 310 configures router 306 to provide at least a sufficient amount of bandwidth to the priority class during peak bandwidth demand along the network path. Although FIG. 4 shows one router, in alternative embodiments, communication network 400 includes additional routers between gateway 402 and server 406.

Figure 5:
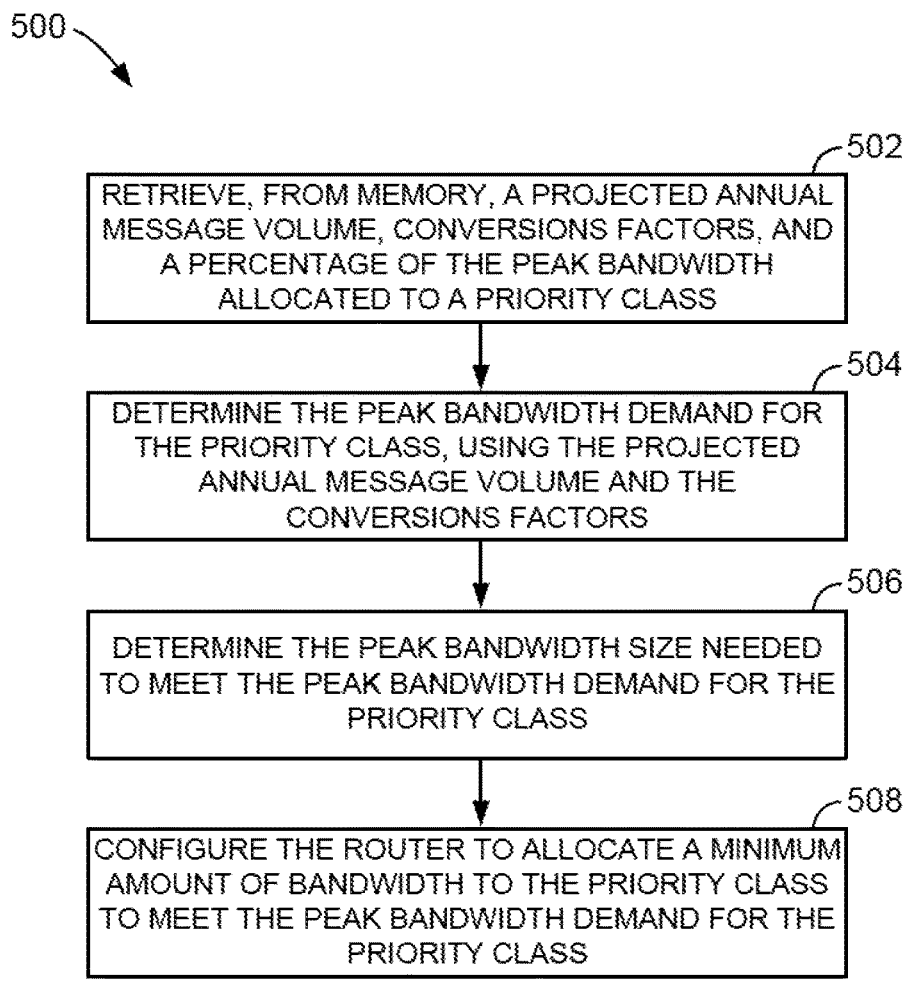

FIG. 5 is a flow diagram 500 illustrating an example method to determine a peak bandwidth demand for a priority class in a communication network and to allocate to the priority class a percentage of peak bandwidth matching the peak bandwidth demand for the priority class, according to some embodiments. The TC computing device retrieves 502, from memory, a projected annual message volume, conversions factors, and a percentage of the overall peak bandwidth allocated to the priority class. The TC computing device determines 504 the peak bandwidth demand for the priority class, using the projected annual message volume and the conversions factors, as described above. Based on the peak bandwidth demand for the priority class and the percentage of the overall peak bandwidth allocated to the priority class, the TC computing device determines 506 the peak bandwidth size needed to meet the sufficient amount of bandwidth dedicated to the priority class during peak bandwidth demand.

The TC computing device, coupled to a router, configures 508 the router to allocate the sufficient amount of bandwidth to the priority class during peak bandwidth demand. The router is configured to receive the sufficient amount of bandwidth data from the TC computing device and allocate the sufficient amount of bandwidth to the priority class.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 105 and 205, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described systems and methods enable allocating a percentage of peak bandwidth to a priority class. More specifically, the systems and methods described herein provides determining a peak bandwidth demand for a priority class and allocating a percentage of peak bandwidth to the priority class that meets the peak bandwidth demand for the priority class.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmission control device for allocating a determined amount of bandwidth for processing a priority class of data messages, said device comprising a processor coupled to a memory and a router, said processor configured to:
   retrieve, from the memory, message volume data including a projected message volume;
   determine a projected peak amount of messages received per second based on the message volume data by multiplying the message volume data by at least one predefined conversion factor, the predefined conversion factor determined by a statistical analysis of historical message arrival rates;
   determine a peak bandwidth demand for the priority class of data messages based upon the projected peak amount of messages received per second; and
   program the router to (i) assign the priority class of data messages to a queue, and (ii) allocate an amount of bandwidth for handling a determined amount of bandwidth demand for the priority class of data messages, wherein the determined amount of bandwidth demand for the priority class of data messages is at least equal to the peak bandwidth demand for the priority class of data messages.

2. The transmission control device of claim 1, wherein a projected peak amount of messages received per day is determined by multiplying a projected peak amount of messages received per month by a predefined conversion factor.

3. The transmission control system of claim 2, wherein the projected peak amount of messages received per hour is determined by multiplying a projected peak amount of messages received per month by a predefined conversion factor.

4. The transmission control device of claim 3, wherein the projected peak amount of messages received per month is determined by multiplying a projected annual message volume by a predefined conversion factor.

5. The transmission control device of claim 1, wherein the message volume data is one or more of a projected annual message volume, a projected monthly message volume, or a projected hourly message volume.

6. The transmission control device of claim 1, wherein the peak bandwidth demand is determined by multiplying the projected peak amount of messages received per second by an average message payload.

7. The transmission control device of claim 1, wherein an amount of peak bandwidth needed to support the determined amount of bandwidth allocated to the priority class of data messages is determined by dividing the peak bandwidth demand for the priority class of data messages by a percentage of the peak bandwidth allocated to the priority class of data messages.

8. A system for allocating a determined amount of bandwidth for processing a priority class of data messages, comprising:
   a processor coupled to a memory and a router, said processor configured to:
   retrieve, from the memory, message volume data including a projected message volume;
   determine a projected peak amount of messages received per second based on the message volume data by multiplying the message volume data by at least one predefined conversion factor, the predefined conversion factor determined by a statistical analysis of historical message arrival rates;
   determine a peak bandwidth demand for the priority class of data messages based upon the projected peak amount of messages received per second; and program the router to (i) assign the priority class of data messages to a queue, and (ii) allocate an amount of bandwidth for handling a determined amount of bandwidth demand for the priority class of data messages, wherein the determined amount of bandwidth demand for the priority class of data messages is at least equal to the peak bandwidth demand for the priority class of data messages.

9. The system in accordance with claim 8, wherein a projected peak amount of messages received per day is determined by multiplying a projected peak amount of messages received per month by a predefined conversion factor.

10. The system in accordance with claim 9, wherein the projected peak amount of messages received per hour is determined by multiplying a projected peak amount of messages received per month by a predefined conversion factor.

11. The system in accordance with claim 10, wherein the projected peak amount of messages received per month is determined by multiplying a projected annual message volume by a predefined conversion factor.

12. The system in accordance with claim 8, wherein the message volume data is one or more of a projected annual message volume, a projected monthly message volume, or a projected hourly message volume.

13. The system in accordance with claim 8, wherein the peak bandwidth demand is determined by multiplying the projected peak amount of messages received per second by an average message payload.

14. The system in accordance with claim 8, wherein an amount of peak bandwidth needed to support the determined amount of bandwidth allocated to the priority class of data messages is determined by dividing the peak bandwidth demand for the priority class of data messages by a percentage of the peak bandwidth allocated to the priority class of data messages.

15. A method for allocating a determined amount of bandwidth for processing a priority class of data messages, the method implemented using a processor coupled to a memory and a router, the method comprising:
retrieving, from the memory, message volume data including a projected message volume;
determining a projected peak amount of messages received per second based on the message volume data by multiplying the message volume data by at least one predefined conversion factor, the predefined conversion factor determined by a statistical analysis of historical message arrival rates;
determining a peak bandwidth demand for the priority class of data messages based upon the projected peak amount of messages received per second; and
program the router to (i) assign the priority class of data messages to a queue, and (ii) allocate an amount of bandwidth for handling a determined amount of bandwidth demand for the priority class of data messages, wherein the determined amount of bandwidth demand for the priority class of data messages is at least equal to the peak bandwidth demand for the priority class of data messages.

16. The method in accordance with claim 15 further comprising determining a projected peak amount of messages received per day by multiplying a projected peak amount of messages received per month by a predefined conversion factor.

17. The method in accordance with claim 16 further comprising determining the projected peak amount of messages received per hour by multiplying a projected peak amount of messages received per month by a predefined conversion factor.

18. The method in accordance with claim 17 further comprising determining the projected peak amount of messages received per month by multiplying a projected annual message volume by a predefined conversion factor.

19. The method in accordance with claim 15, wherein the message volume data is one or more of a projected annual message volume, a projected monthly message volume, or a projected hourly message volume.

20. The method in accordance with claim 15 further comprising determining the peak bandwidth demand by multiplying the projected peak amount of messages received per second by an average message payload.

21. The method in accordance with claim 15 further comprising determining an amount of peak bandwidth needed to support the determined amount of bandwidth allocated to the priority class of data messages by dividing the peak bandwidth demand for the priority class of data messages by a percentage of the peak bandwidth allocated to the priority class of data messages.

* * * * *